United States Patent
Goto et al.

(10) Patent No.: US 8,379,580 B2
(45) Date of Patent: Feb. 19, 2013

(54) RADIO COMMUNICATION SYSTEM, RADIO COMMUNICATION METHOD, BASE STATION AND RADIO TERMINAL

(75) Inventors: Yoshikazu Goto, Yokosuka (JP);
Akihito Hanaki, Yokohama (JP);
Takahiro Hayashi, Yokosuka (JP);
Junichiro Kawamoto, Tokyo (JP);
Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 777 days.

(21) Appl. No.: 12/254,889

(22) Filed: Oct. 21, 2008

(65) Prior Publication Data
US 2009/0103479 A1 Apr. 23, 2009

(30) Foreign Application Priority Data
Oct. 22, 2007 (JP) ................................ 2007-274266

(51) Int. Cl.
*H04W 4/00* (2009.01)

(52) U.S. Cl. ............ 370/329; 370/230.1; 370/232; 370/235; 370/236; 455/115.3; 455/63.1; 455/67; 455/522; 455/69

(58) Field of Classification Search ............... 455/115.3
See application file for complete search history.

(56) References Cited

U.S. PATENT DOCUMENTS

| | | | |
|---|---|---|---|
| 6,718,181 B1 | 4/2004 | Sumasu et al. | |
| 6,728,217 B1 * | 4/2004 | Amirijoo et al. | 370/252 |
| 6,909,905 B2 * | 6/2005 | Umeda et al. | 455/522 |
| 6,975,604 B1 * | 12/2005 | Ishida et al. | 370/331 |
| 7,447,516 B2 | 11/2008 | Heo et al. | |
| 7,860,052 B2 * | 12/2010 | Lohr et al. | 370/329 |
| 2004/0005898 A1 * | 1/2004 | Kato et al. | 455/450 |
| 2004/0127158 A1 * | 7/2004 | Dai et al. | 455/12.1 |
| 2004/0218533 A1 * | 11/2004 | Kim et al. | 370/235 |
| 2004/0252658 A1 * | 12/2004 | Hosein et al. | 370/328 |
| 2005/0030953 A1 | 2/2005 | Vasudevan et al. | |
| 2006/0013182 A1 | 1/2006 | Balasubramanian et al. | |
| 2006/0215602 A1 * | 9/2006 | Usuda et al. | 370/328 |

(Continued)

FOREIGN PATENT DOCUMENTS

| | | |
|---|---|---|
| CN | 1716837 A | 1/2006 |
| CN | 1921351 A | 2/2007 |

(Continued)

OTHER PUBLICATIONS

3GPP TS 25.321 V7.6.0 (Sep. 2007), 3rd Generation Partnership Project; Technical Specification Group Radio Access Network; Medium Access Control (MAC) protocol specification (Cont.) (Release 7), 146 pages, XP002516101.

(Continued)

*Primary Examiner* — Ian N Moore
*Assistant Examiner* — Dung B Huynh
(74) *Attorney, Agent, or Firm* — Marvin A. Motsenbocker; Mots Law, PLLC

(57) ABSTRACT

A radio terminal 10 transmits, to a base station 100, uplink scheduling information including at least a transmission power ratio (UPH) indicating a ratio of a maximum transmission power to a transmission power of a DPCCH. The base station 100 transmits, to the radio terminal 10, transmission rate decrease data that instructs a decrease of a transmission rate assigned to the radio terminal 10, when the transmission power ratio included in the uplink scheduling information is below a first threshold.

10 Claims, 7 Drawing Sheets

U.S. PATENT DOCUMENTS

| | | | |
|---|---|---|---|
| 2006/0280145 A1* | 12/2006 | Revel et al. | 370/331 |
| 2007/0041342 A1* | 2/2007 | Usuda et al. | 370/329 |
| 2007/0066339 A1 | 3/2007 | Usuda et al. | |
| 2007/0189199 A1* | 8/2007 | Nishio | 370/328 |
| 2007/0248035 A1* | 10/2007 | Sang et al. | 370/318 |
| 2008/0045255 A1* | 2/2008 | Revel et al. | 455/510 |
| 2008/0049669 A1* | 2/2008 | Lundby et al. | 370/329 |
| 2008/0254819 A1* | 10/2008 | Niwano et al. | 455/522 |
| 2009/0034474 A1* | 2/2009 | Yavuz et al. | 370/331 |
| 2010/0061480 A1* | 3/2010 | Kashiwase et al. | 375/295 |

FOREIGN PATENT DOCUMENTS

| | | |
|---|---|---|
| JP | 2000-049663 A | 2/2000 |
| JP | 2001-053676 A | 2/2001 |
| JP | 2002-374205 A | 12/2002 |
| JP | 2006-115410 A | 4/2006 |
| JP | 2006-518163 A | 8/2006 |
| JP | 2007-060173 A | 3/2007 |
| JP | 2007-267070 A | 10/2007 |
| KR | 2007-0068319 A | 6/2007 |

OTHER PUBLICATIONS

3GPP TS 25.321 V7.5.0 (Jun. 2007), 3rd Generation Partnership Project; Technical Specification Group Radio Access Network; Medium Access Control (MAC) protocol specification (Release 7), 141 pages.

The office action of Jun. 26, 2012, issued in the counterpart Japanese patent application.

The office action of Jun. 28, 2011, issued in the counterpart Korean patent application.

* cited by examiner

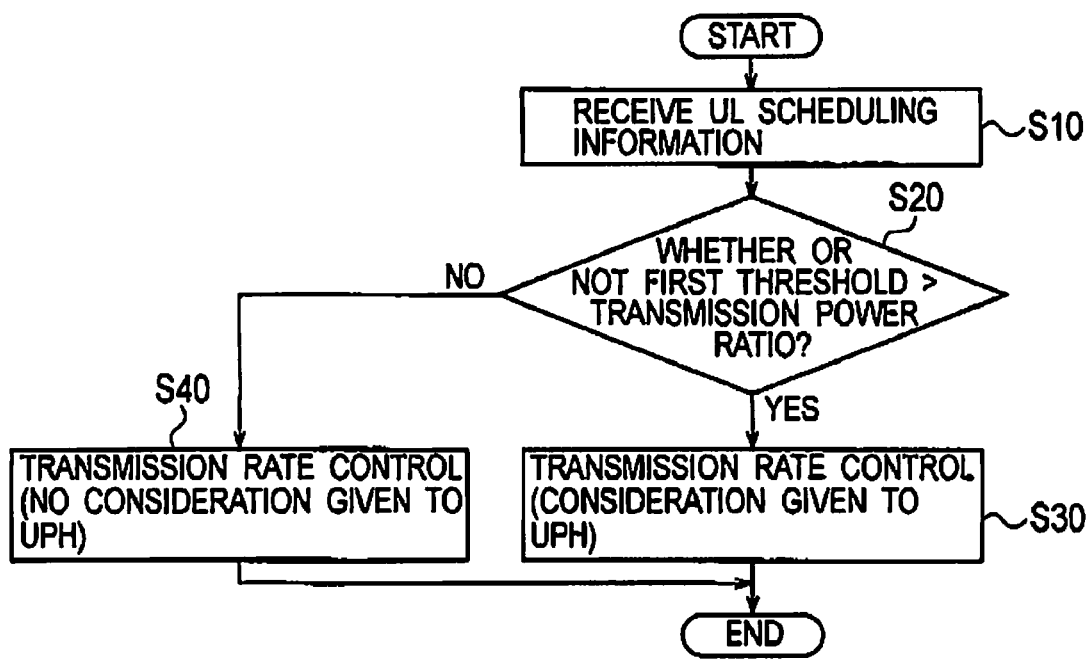
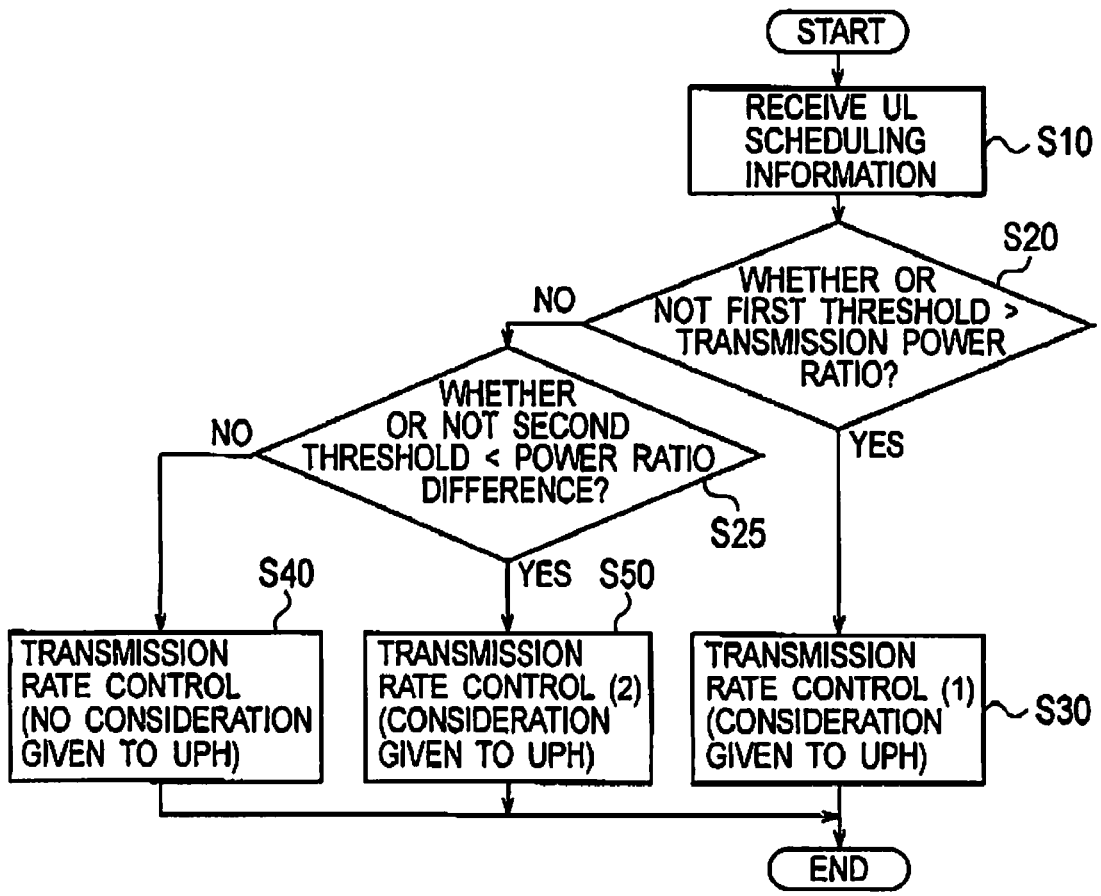

RADIO COMMUNICATION SYSTEM, RADIO COMMUNICATION METHOD, BASE STATION AND RADIO TERMINAL

CROSS REFERENCE TO RELATED APPLICATION

This application is based upon and claims the benefit of priority from prior Japanese Patent Application No. 2007-274266, filed on Oct. 22, 2007; the entire contents of which are incorporated herein by reference.

BACKGROUND OF THE INVENTION

1. Field of the Invention

The present invention relates to a radio communication system, a base station, and a radio terminal, in which a radio terminal transmits uplink user data to a base station via an enhanced dedicated physical data channel and a transmission rate of the uplink user data is determined based on a ratio of a transmission power of the enhanced dedicated physical data channel to a transmission power of a dedicated physical control channel.

2. Description of the Related Art

Heretofore, a radio communication system including a base station and a radio network controller has been known. In the radio communication system, the base station has a single or multiple cells, and a radio communication is performed between each of the cells and a plurality of radio terminals. The radio network controller controls a plurality of base stations, and assigns radio resources to the plurality of radio terminals. Note that such a technique (hereinafter referred to as first technique) is sometimes referred to as R99 (Release 99) or the like.

For the purpose of improving the throughput and shortening the delay time, and the like, there has recently been proposed a technique in which a base station assigns the radio resources to uplink user data transmitted from each of the radio terminals to the base station (network side). Note that such a technique (hereinafter referred to as a second technique) is sometimes referred to as the high speed uplink packet access (HSUPA), the enhanced uplink (EUL) or the like.

Each of the cells functions as a serving cell or as a non-serving cell. A transport block size (TBS) is determined based on the transmission rate (for example, a scheduling grant (SG)) of the uplink user data, and is controlled by transmission rate control data transmitted from the serving cell and the non-serving cell. The transmission rate control data includes an absolute grant (AG) for controlling an absolute value of the transmission rate, and a relative grant (RG) for controlling a relative value of the transmission rate (for example, see 3GPP TS25.321 Ver. 7.5.0).

Here, the uplink user data is transmitted to the base station from the radio terminals via an enhanced dedicated physical data channel (E-DPDCH). The absolute grant (AG) is transmitted from the radio base station to the radio terminals via an E-DCH absolute grant channel (E-AGCH). The relative grant (RG) is transmitted from the radio base station to the radio terminals via an E-DCH relative grant channel (E-RGCH).

The serving cell transmits the absolute grant (AG) and the relative grant (RG) to the radio terminals. Meanwhile, the non-serving cell transmits, to the radio terminals, only the relative grant (RG) without transmitting the absolute grant (AG).

SUMMARY OF THE INVENTION

In the radio communication system, a state where a radio terminal is connected to multiple cells (i.e., a handover state) can be considered.

In the above-described first technique, in the handover state, each of the cells reports, to the radio network controller, whether or not the cell has successfully received uplink user data transmitted from the radio terminal. The radio network controller instructs the radio terminal to decrease the transmission power of the uplink user data when any of the cells successfully receives the uplink user data. When all of the cells cannot receive the uplink user data from the radio terminal, the radio network controller instructs the radio terminal to so increase the transmission power of the uplink user data. Thus, the increase of the transmission power of the uplink user data is suppressed, whereby interference power in each of the cells is suppressed.

On the other hand, the suppression of the interference power in each of the cells is also important for the above-described second technique. However, in the second technique, it is not effective to perform the transmission power control at the radio network controller. Specifically, in the second technique, a base station assigns the radio resources to shorten a delay time. Accordingly, the transmission power control at the radio network controller causes an increase of the delay time. Therefore, in the second technique, the radio network controller does not perform the transmission power control.

Here, it is conceivable that the cell (own cell) suppresses an interference power generated in the own cell by transmitting an RG to the radio terminal using the own cell as a non-serving cell. However, in this configuration, setting an E-RGCH between the non-serving cell and the radio terminal is required.

Moreover, it is also conceivable that the own cell decreases the SG assigned to the radio terminal, in response to the notification from a different cell (different cell) that an interference power being attributable to the uplink user data transmitted from the radio terminal using the own cell as a serving cell is generated in the different cell. However, in this a configuration, transmission/reception of information or the like between the cells (between the own cell and the different cell) complicates control for suppressing the interference power.

A first aspect of the present invention is summarized as a radio communication system in which a radio terminal transmits uplink user data to a base station via an enhanced dedicated physical data channel, and a transmission rate of the uplink user data is determined based on a ratio of a transmission power of the enhanced dedicated physical data channel to a transmission power of a dedicated physical control channel. The radio terminal includes a terminal side transmitting unit (a communication unit 11) configured to transmit, to the base station, uplink scheduling information, which includes at least a transmission power ratio indicating a ratio of a maximum transmission so power allowed to the radio terminal to the transmission power of the dedicated physical control channel. The base station includes: a determination unit (a determination unit 125) configured to determine whether or not the transmission power ratio is below a first threshold; and a base station side transmitting unit (a scheduling unit 120a) configured to transmit to the radio terminal, transmission rate decrease data that instructs a decrease of the transmission rate assigned to the radio terminal, when the transmission power ratio is below the first threshold.

According to this aspect, the base station side transmitting unit transmits to the radio terminal, transmission rate decrease data that instructs a decrease of the transmission rate assigned to the radio terminal, when the transmission power ratio is below the first threshold. Therefore, when the radio terminal is located at the end of the cell (own cell) and transmits the uplink user data, the interference power caused in the different cell can be suppressed.

A second aspect of the invention is summarized as a radio communication system in which a radio terminal transmits uplink user data to a base station via an enhanced dedicated physical data channel, and a transmission rate of the uplink user data is determined based on a ratio of a transmission power of the enhanced dedicated physical data channel to a transmission power of a dedicated physical control channel. The radio terminal includes a terminal side transmitting unit (a communication unit 11) configured to transmit, to the base station, uplink scheduling information, which includes at least a transmission power ratio indicating a ratio of a maximum transmission power allowed to the radio terminal to the transmission power of the dedicated physical control channel the base station includes: a controlling unit (scheduling unit 120a) configured to control the transmission rate assigned to the radio terminal by referring to the uplink scheduling information; a determination unit (a determination unit 125) configured to determine whether or not a power ratio difference exceeds a second threshold, the power ratio difference being a difference obtained by subtracting a new transmission power ratio from an old transmission power ratio; and a base station side transmitting unit (the scheduling unit 120a) configured to transmit, to the radio terminal, transmission rate decrease data that instructs a decrease of the transmission rate assigned to the radio terminal, when the power ratio difference exceeds the second threshold. The old transmission power ratio indicates the transmission power ratio included in the uplink scheduling information referred to when the base station controls the transmission rate assigned to the radio terminal, and the new transmission power ratio indicates the transmission power ratio included in the uplink scheduling information newly received from the radio terminal.

In the first aspect, the base station further includes: a controlling unit (scheduling unit 120a) configured to control the transmission rate assigned to the radio terminal by referring to the uplink scheduling information. The determination unit determines whether or not a power ratio difference exceeds a second threshold, the power ratio difference being a difference obtained by subtracting a new transmission power ratio from an old transmission power ratio. The old transmission power ratio indicates the transmission power ratio included in the uplink scheduling information referred to when the base station controls the transmission rate assigned to the radio terminal, and the new transmission power ratio indicates the transmission power ratio included in the uplink scheduling information newly received from the radio terminal. The base station side transmitting unit transmits, to the radio terminal, transmission rate decrease data, when the power ratio difference exceeds the second threshold.

In the first aspect, the terminal side transmitting unit transmits, to the base station, a reception quality value indicating a reception quality of a downlink signal received from the base station. The determination unit determines whether or not the reception quality value is below a third threshold. Further, the base station side transmitting unit transmits, to the radio terminal, the transmission rate decrease data, when the transmission power ratio is below the first threshold and the reception quality value is below the third threshold.

In the second aspect described above, the terminal side transmitting unit transmits, to the base station, a reception quality value indicating a reception quality of a downlink signal received from the base station. The determination unit determines whether or not the reception quality value is below a third threshold. Further, the base station side transmitting unit transmits, to the radio terminal, the transmission rate decrease data, when the power ratio difference exceeds the second threshold and the reception quality value is below the third threshold.

A third aspect is summarized as a radio communication method in which a radio terminal transmits uplink user data to a base station via an enhanced dedicated physical data channel and a transmission rate of the uplink user data is determined based on a ratio of a transmission power of the enhanced dedicated physical data channel to a transmission power of a dedicated physical control channel, including: transmitting, from the radio terminal to the base station, uplink scheduling information, which includes at least a transmission power ratio indicating a ratio of a maximum transmission power allowed to the radio terminal to the transmission power of the dedicated physical control channel; determining, at the base station, whether or not the transmission power ratio is below a first threshold; and transmitting, from the base station to the radio terminal, transmission rate decrease data that instructs a decrease of the transmission rate assigned to the radio terminal, when the transmission power ratio is below the first threshold.

A fourth aspect of the present invention is summarized as a radio communication method in which a radio terminal transmits uplink user data to a base station via an enhanced dedicated physical data channel and a transmission rate of the uplink user data is determined based on a ratio of a transmission power of the enhanced dedicated physical data channel to a transmission power of a dedicated physical control channel, including: transmitting, from the radio terminal to the base station, uplink scheduling information, which includes at least a transmission power ratio indicating a ratio of a maximum transmission power allowed to the radio terminal to the transmission power of the dedicated physical control channel, controlling, at the base station, the transmission rate assigned to the radio terminal by referring to the uplink scheduling information; determining, at the base station, whether or not a power ratio difference exceeds a second threshold, the power ratio difference being a difference obtained by subtracting a new transmission power ratio from an old transmission power ratio; and transmitting, from the base station to the radio terminal, transmission rate decrease data that instructs a decrease of the transmission rate assigned to the radio terminal, when the power ratio difference exceeds the second threshold. The old transmission power ratio indicates the transmission power ratio included in the uplink scheduling information referred to when the base station controls the transmission rate assigned to the radio terminal, and the new transmission power ratio indicates the transmission power ratio included in the uplink scheduling information newly received from the radio terminal.

A fifth aspect of the invention is summarized as a base station configured to receive uplink user data from a radio terminal via an enhanced dedicated physical data channel and to determine a transmission rate of the uplink user data based on a ratio of a transmission power of the enhanced dedicated physical data channel to a transmission power of a dedicated physical control channel, including: a receiving unit (communication unit 110) configured to receive, from the radio terminal, uplink scheduling information, which includes at least a transmission power ratio indicating a ratio of a maximum transmission power allowed to the radio terminal to the transmission power of the dedicated physical control channel; a determination unit (determination unit 125) configured to determine whether or not the transmission power ratio is below a first threshold; and a base station side transmitting unit (scheduling unit 120a) configured to transmit, to the radio terminal, transmission rate decrease data that instructs a decrease of the transmission rate assigned to the radio terminal, when the transmission power ratio is below the first threshold.

A sixth aspect of the invention is summarized as a base station configured to receive uplink user data from a radio terminal via an enhanced dedicated physical data channel and to determine a transmission rate of the uplink user data based on a ratio of a transmission power of the enhanced dedicated physical data channel to a transmission power of a dedicated physical control channel, including: a receiving unit (communication unit 110) configured to receive, from the radio terminal, uplink scheduling information, which includes at least a transmission power ratio indicating a ratio of a maximum transmission power allowed to the radio terminal to the transmission power of the dedicated physical control channel; a controlling unit (scheduling unit 120a) configured to control the transmission rate assigned to the radio terminal by referring to the uplink scheduling information; a determination unit (determination unit 125) configured to determine whether or not a power ratio difference exceeds a second threshold, the power ratio difference being a difference obtained by subtracting a new transmission power ratio from an old transmission power ratio; and a base station side transmitting unit (scheduling unit 120a) configured to transmit, to the radio terminal, transmission rate decrease data that instructs a decrease of the transmission rate assigned to the radio terminal, when the power ratio difference exceeds the second threshold. The old transmission power ratio indicates the transmission power ratio included in the uplink scheduling information referred to when the base station controls the transmission rate assigned to the radio terminal, and the new transmission power ratio indicates the transmission power ratio included in the uplink scheduling information newly received from the radio terminal.

A seventh aspect of the invention is summarized as a radio terminal which transmits uplink user data to a base station via an enhanced dedicated physical data channel and a transmission rate of the uplink user data is determined based on a ratio of a transmission power of the enhanced dedicated physical data channel to a transmission power of a dedicated physical control channel, including: an obtaining unit (scheduling information generating unit 14) configured to obtain a transmission power ratio indicating a ratio of a maximum transmission power allowed to the radio terminal to the transmission power of the dedicated physical control channel; and a transmission rate controlling unit (SG controlling unit 12) configured to decrease a transmission rate assigned to the radio terminal, when the transmission power ratio is below a first threshold.

A eighth aspect of the invention is summarized as a radio terminal which transmits uplink user data to a base station via an enhanced dedicated physical data channel and a transmission rate of the uplink user data is determined based on a ratio of a transmission power of the enhanced dedicated physical data channel to a transmission power of a dedicated physical control channel, including: an obtaining unit (scheduling information generating unit 14) configured to obtain a transmission power ratio indicating a ratio of a maximum transmission power allowed to the radio terminal to the transmission power of the dedicated physical control channel; and a transmission rate controlling unit (SG controlling unit 12) configured to decrease a transmission rate assigned to the radio terminal, when a power ratio difference exceeds the second threshold, the power ratio difference being a difference obtained by subtracting a new transmission power ratio from an old transmission power ratio. The old transmission power ratio indicates the transmission power ratio used for controlling the transmission rate assigned to the radio terminal, and the new transmission power ratio indicates the transmission power ratio newly obtained by the obtaining unit.

BRIEF DESCRIPTION OF THE DRAWINGS

FIG. 6 is a flowchart showing operations of the base station 100 (cell) according to the first embodiment.

FIG. 7 is a flowchart showing operations of a base station 100 (cell) according to a second embodiment.

DESCRIPTION OF THE EMBODIMENTS

Figure 1:
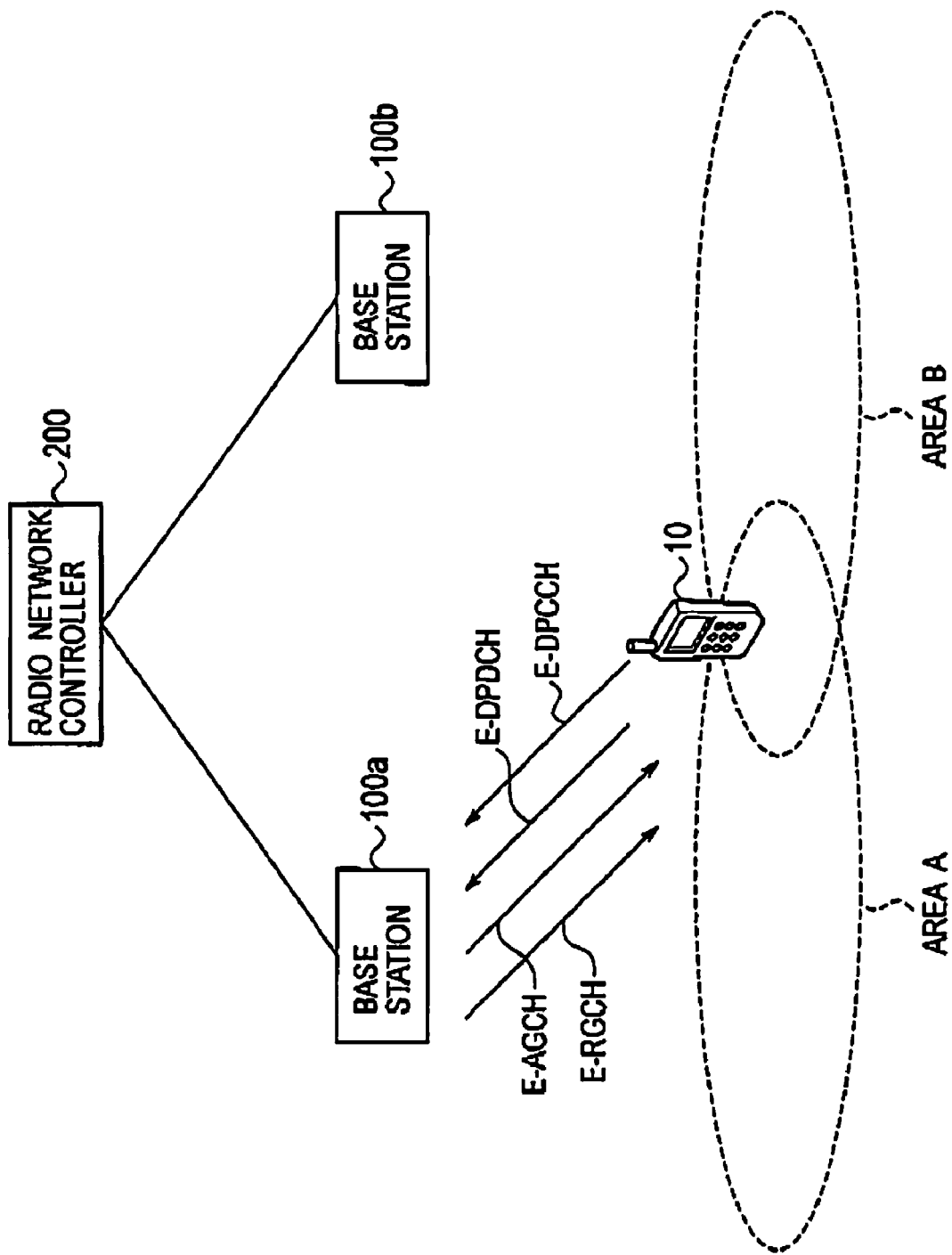
FIG. 1 is a view showing a radio communication system according to a first embodiment.

With reference to the accompanying drawings, a radio communication system according to an embodiment of the present invention will be described below. Note that, in the following description of the drawings, the same or similar parts will be denoted by the same or similar reference numerals.

However, it should be noted that the drawings are schematic and ratios of dimensions and the like are different from actual ones. Therefore, specific dimensions and the like should be determined by taking into consideration the following description. Moreover, as a matter of course, also among the drawings, there are included portions in which dimensional relationships and ratios are different from each other.

First Embodiment (Configuration of Radio Communication System)

With reference to the accompanying drawings, a configuration of a radio communication system according to a first embodiment will be described below. FIG. 1 is a view showing the radio communication system according to the first embodiment.

As shown in FIG. 1, the radio communication system includes a radio terminal 10, a base station 100 (a base station 100a or a base station 100b), and a radio network controller 200. Note that, in FIG. 1, an example is shown in which the radio terminal 10 communicates with the base station 100a.

The radio terminal 10 transmits uplink user data to the base station 100a. Specifically, the radio terminal 10 transmits the uplink user data to the base station 100a via a dedicated physical data channel (DPDCH) in a framework in which a radio network controller 200 performs a radio resource allocation and the like. Note that the framework in which the radio network controller 200 performs the radio resource allocation and the like is sometimes referred to as R99 (Release 99) or the like.

The radio terminal 10 transmits uplink control data to the base station 100a via a dedicated physical control channel (DPCCH) in the framework in which the radio network controller 200 performs radio resource allocation and the like.

Note that, a transmission power of the DPCCH is controlled by a TPC command received from the base station 100, as in the case of general closed-loop power control. The TPC command is a command generated at the base station 100 by comparing a reception quality with a target quality of an uplink signal.

Meanwhile, the radio terminal 10 transmits uplink user data to the base station 100a via an enhanced dedicated physical data channel (E-DPDCH) in a framework in which the base station 100 performs the radio resource allocation and the like. Note that the framework in which the base station 100 performs the radio resource allocation and the like is sometimes referred to as the high speed uplink packet access (HSUPA), the enhanced uplink (EUL) or the like.

Here, the uplink user data is divided into blocks for each transmission time interval (TTI), that is, for each process (HARQ process). Each of the blocks (MAC-e PDU) is transmitted by use of a process (hereinafter referred to as an active process) assigned to the radio terminal 10.

Moreover, one cycle (HARQ RTT) is configured of a predetermined number of processes (process #1 to process #n) and each of the cycle is repeated. Note that the number of processes included in one cycle is set according to a TTI length. For example, when the TTI length is 2 ms, the number of processes included in one cycle is "8". When the TTI length is 10 ms, the number of processes included in one cycle is "4".

Here, the radio terminal 10 has a table associating a transmission power ratio with the transmission rate. This table is used for transmitting the uplink user data from the radio terminal 10 via the E-DPDCH.

The transmission power ratio is a ratio of a transmission power of the E-DPDCH to a transmission power of the DPCCH (E-DPDCH/DPCCH). The transmission rate is represented by a transport block size (TBS).

The transmission power ratio assigned to the radio terminal 10 will be hereinafter referred to as a scheduling grant (SG). Note that the transmission power ratio and the transmission rate are associated one-to-one with each other. Thus, the scheduling grant (SG) may be considered not only as a term representing the transmission power ratio assigned to the radio terminal 10 but also as a term representing the transmission rate assigned to the radio terminal 10.

Note that, as described later, the radio terminal 10 updates the SG according to the transmission rate control data (AG or RG) received from the base station 100a (see 3GPP TS25.321 Ver. 7.5.0 11.8.1.3 "Scheduling grant Update"). Subsequently, the radio terminal 10 determines a transmission rate (that is, TBS) corresponding to the SG by referring to the table associating the transmission power ratio with the transmission rate (see 3GPP TS25.321 Ver. 7.5.0 11.8.1.4 "E-TFC Selection").

In a framework in which the base station 100 performs the radio resource allocation and the like, the radio terminal 10 transmits uplink control data to the base station 100a via the enhanced dedicated physical control channel (E-DPCCH) or the like. The uplink control data includes UL (uplink) scheduling information and the like that is referred to by the base station 100a when the performing the radio resource allocation.

The UL scheduling information includes "HLID (Highest priority Logical Channel ID)", "TEBS (Total E-DCH Buffer Status)", "HLBS (Highest priority Logical Channel Buffer Status)", "UPH (User Power Headroom)" and the like (see 3GPP TS25.321 Ver. 7.5.0 9.2.5.3.2 "Scheduling Information").

"HLID" is an identifier for identifying a highest priority logical channel among logical channels for transporting the uplink user data.

"TEBS" is information indicating an amount (buffer amount) of the uplink user data stored in a transmission buffer provided in the radio terminal 10.

"HLBS" is an amount (buffer amount) of uplink user data corresponding to the logical channel identified by the HLID among the uplink user data stored in the transmission buffer provided in the radio terminal 10.

"UPH" is a transmission power ratio indicating a ratio of a maximum UE transmission power to a transmission power of the DPCCH. The maximum UE transmission power indicates a maximum transmission power allowed to the radio terminal 10. For example, the UPH is represented by "(maximum UE transmission power)/(transmission power of DPCCH)".

Figure 2:
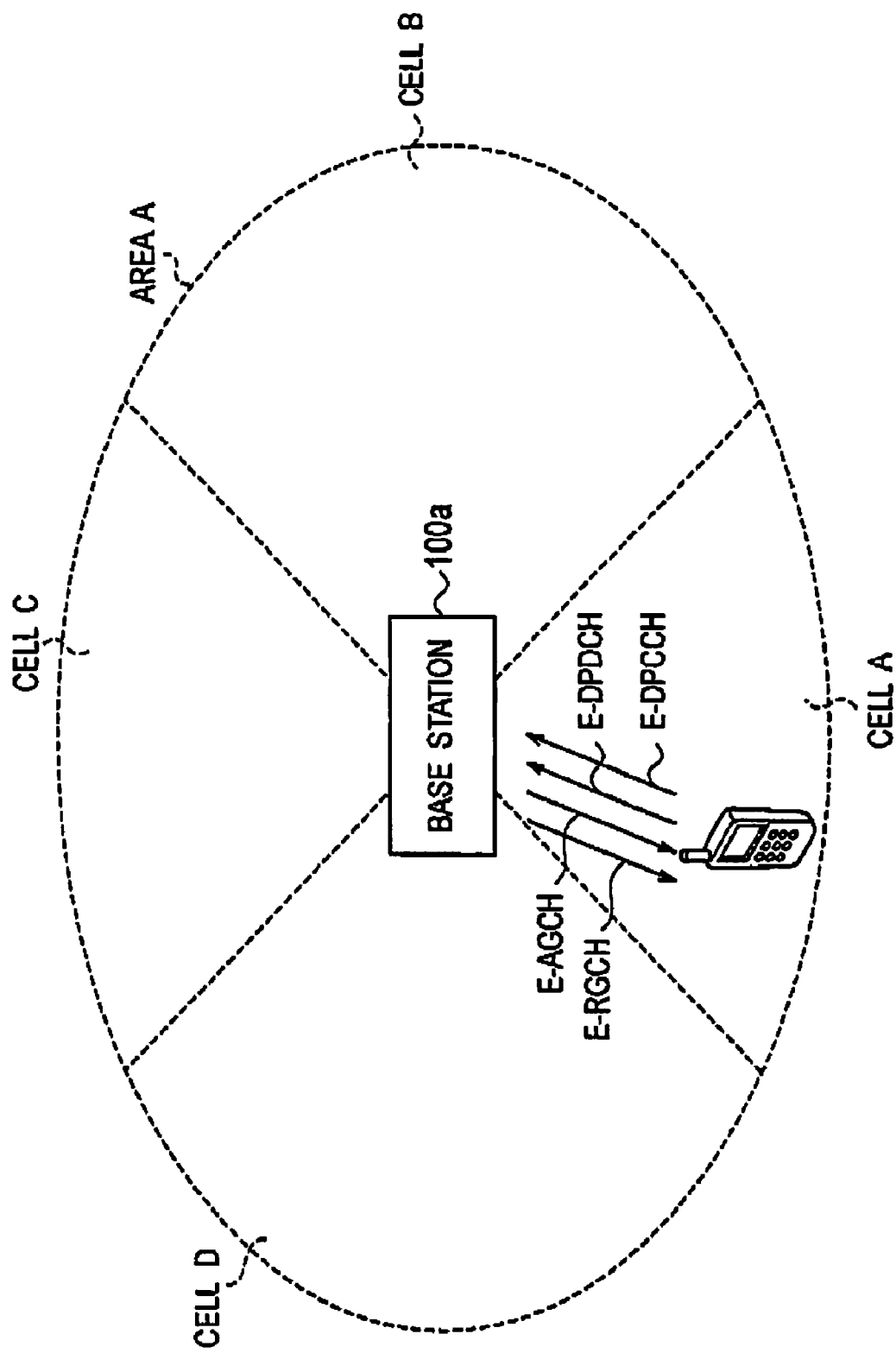
FIG. 2 is a view showing the radio communication system according to the first embodiment.

The base station 100a, as shown in FIG. 2, controls a plurality of cells (cells A to D), and each of the cells communicates with the radio terminal 10 located in each of the cell. Each of the cells functions as a serving cell of a non-serving cell.

Note that the "cell" is basically used as a term representing a function for communicating with the radio terminal 10. Further, note that the "cell" is sometimes used as a term representing an area w which the radio terminal 10 is located.

For example, in FIG. 2, the radio terminal 10 performs a communication according to an instruction from an EUL scheduler provided in the cell A (in other words, the radio terminal performs a communication according to an AG received from the cell A via E-AGCH). In this example, the cell A is a serving cell for the radio terminal 10 and the cells B to D are non-serving cells for the radio terminal 10. Meanwhile, the radio terminal 10 is referred to as a serving terminal for the cell A and as a non-serving terminal for the cells B to D.

The base station 100 receives uplink user data from the radio terminal 10 via the data channel such as the DPDCH or the E-DPDCH. Meanwhile, the base station 100 transmits, to the radio terminal 10, transmission rate control data for controlling a transmission rate of the uplink user data transmitted via the E-DPDCH. Note that the transmission rate control data includes an absolute grant (AG) for directly specifying the transmission rate and a relative grant (RG) for relatively specifying the transmission rate.

The absolute grant (AG) is data (index) directly specifying the transmission power ratio (E-DPDCH/DPCCH) assigned to the radio terminal 10 (see 3GPP TS25.212 Ver. 7.5,0 4.10.1A.1 "information field mapping of the Absolute Grant Value").

As described above, the absolute grant (AG) is a command directly specifying the transmission rate value without relying on the current transmission rate.

The relative grant (RG) is data ("Up", "Down" and "Hold") relatively specifying the transmission power ratio (E-DPDCH/DPCCH) assigned to the radio terminal 10 (see 3GPP TS25.321 Ver 7.5.0 9.2.5.2.1 "Relative Grant").

As described above, the relative grant (RG) is a command relatively controlling the current transmission rate. Specifically, the relative grant (RG) includes an increase command "Up" for instructing an increase of the current transmission rate, a retention command "Hold" for instructing a retention of the current transmission rate, and a decrease command "Down" for instructing a decrease of the current transmission rate. Here, the increase command instructs the increase of the transmission rate by a predetermined amount Further, the decrease command instructs the decrease of the transmission rate by a predetermined amount. The predetermined amount for the increase may be the same as or smaller than the predetermined amount for the decrease.

The base station 100*a* transmits the absolute grant (AG) to the radio terminal 10 via the E-DCH absolute grant channel (E-AGCH). Further, the base station 100*a* transmits the relative grant (RG) to the radio terminal 10 via the E-DCH relative grant channel (E-RGCH).

For example, the serving cell (here, the cell A) transmits the AG to the radio terminal 10 via the E-AGCH and transmits the RG to the radio terminal 10 via the E-RGCH. Meanwhile, the non-serving cell (here, the cell B) transmits the RG to the radio terminal 10 via the E-RGCH without transmitting the AG to the radio terminal 10 via the E-AGCH.

It should be note that, in FIGS. 1 and 2, the channels (the DPDCH, the DPCCH and the like) used in the R99 are merely omitted for simplifying the description. It should also be noted that multiple number of the radio terminals 10 existed in each of the cells are omitted in the description.

Further, the cell used as the serving cell by the radio terminal 10 is not limited to one cell but may be more than one cell.

(Configuration of Radio Terminal)

Figure 3:
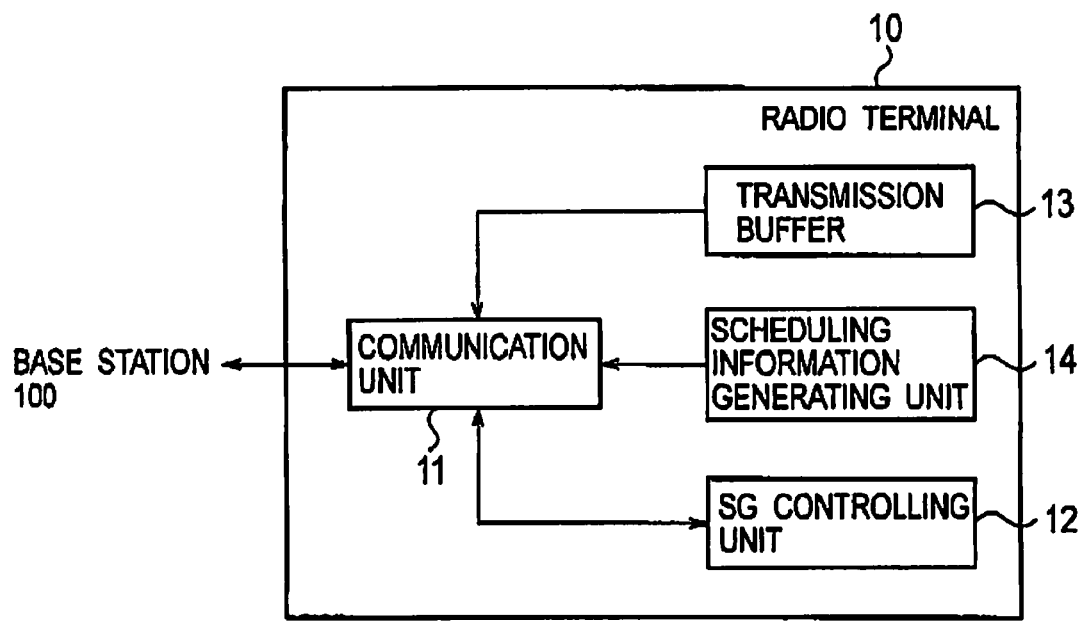
FIG. 3 is a block diagram showing a radio terminal 10 according to the first embodiment.

With reference to the accompanying drawings, description will be given below of a configuration of the radio terminal according to the first embodiment. FIG. 3 is a block diagram showing the radio terminal 10 according to the first embodiment.

As shown in FIG. 2, the radio terminal 10 includes a communication unit 11, a SG controlling unit 12, a transmission buffer 13 and a scheduling information generating unit 14.

The communication unit 11 communicates with the base station 100. Specifically, the communication unit 11 transmits the uplink user data to the base station 100 via the E-DPDCH. The communication unit 11 transmits the uplink control data (for example, the UL scheduling information described above) to the base station 100 via the E-DPCCH. Meanwhile, the communication unit 11 receives, from the base station 100, transmission rate control data (the AG or the RG described above) for controlling a transmission rate of the uplink user data.

The SG controlling unit 12 controls an SG assigned to the uplink user data. The SG controlling unit 12 has a table for associating a transmission power ratio (SG) with a transmission rate (TBS).

As described above, the SG controlled by the SG controlling unit 12 is controlled by the AG or the RG received from the base station 100. The transmission rate of the uplink user data is selected from a range that does not exceed the TBS associated with the SG.

The transmission buffer 13 is a buffer for storing the uplink user data. The communication unit 11 described above transmits the uplink user data stored in the transmission buffer 13.

The scheduling information generating unit 14 generates uplink scheduling information (UL scheduling information) referred to by the base station 100*a* when performing the radio resource allocation. Specifically, the UL scheduling information is referred to in control of the SG assigned to the radio terminal 10. The UL scheduling information includes, as described above, "HLID", "TEBS", "HLBS", "UPH" and the like. As a matter of course, the scheduling information generating unit 14 generates the UL scheduling information after obtaining "HLID", "TEBS", "HLBS", "UPH" and the like.

(Configuration of Base Station)

Figure 4:
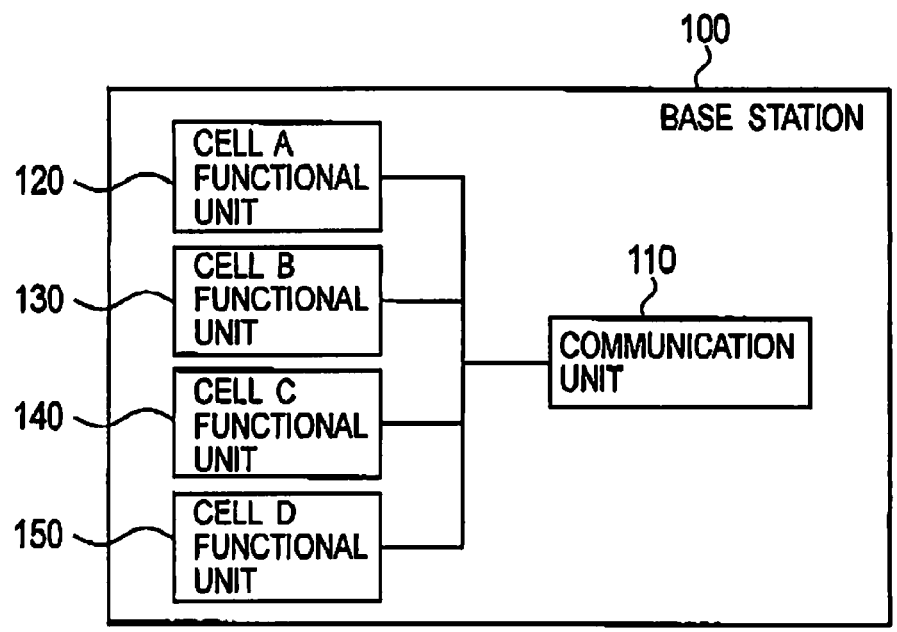
FIG. 4 is a block diagram showing a base station 100 according to the first embodiment.

With reference to the accompanying drawings, description will be given of a configuration of the base station according to the first embodiment. FIG. 4 is a block diagram showing the base station 100 according to the first embodiment.

As shown in FIG. 4, the base station 100 includes a communication unit 110, a cell A functional unit 120, a cell B functional unit 130, a cell C functional unit 140 and a cell D functional unit 150.

The communication unit 110 communicates with the plurality of radio terminals 10 located in the cells A to D, respectively. Specifically, the communication unit 110 receives uplink user data from each of the plurality of radio terminals 10 via the data channel such as the DPDCH or the E-DPDCH. Further, the communication unit 110 receives uplink user data from each of the plurality of radio terminals 10 via the control channel such as the DPCCH or the E-DPCCH. Meanwhile, the communication unit 110 transmits the control data (AG or RG) to each of the plurality of radio terminals 10 via the control channel such as the E-AGCH and the E-RGCH.

Note that the communication unit 110 also communicates with upper apparatuses (such as a radio network controlling unit, a switching apparatus or the like), which controls the base station 100.

The cell A functional unit 120 functions as a serving cell for the radio terminals 10 located in the cell A. Meanwhile, the cell A functional unit 120 functions as a non-serving cell for radio terminals 10 located in the cells B to D.

The cell B functional unit 130 functions as a serving cell for radio terminals 10 located in the cell B. Meanwhile, the cell B functional unit 130 functions as a non-serving cell for radio terminals 10 located in the cells A, C and D.

The cell C functional unit 140 functions as a serving cell for radio terminals 10 located in the cell C. Meanwhile, the cell C functional unit 140 functions as a non-serving cell for radio terminals 10 located in the cells A, B and D.

The cell D functional unit 150 functions as a serving cell for radio terminals 10 located in the cell D. Meanwhile, the cell D functional unit 150 functions as a non-serving cell for radio terminals 10 located in the cells A to C.

(Configuration of Cell)

Figure 5:
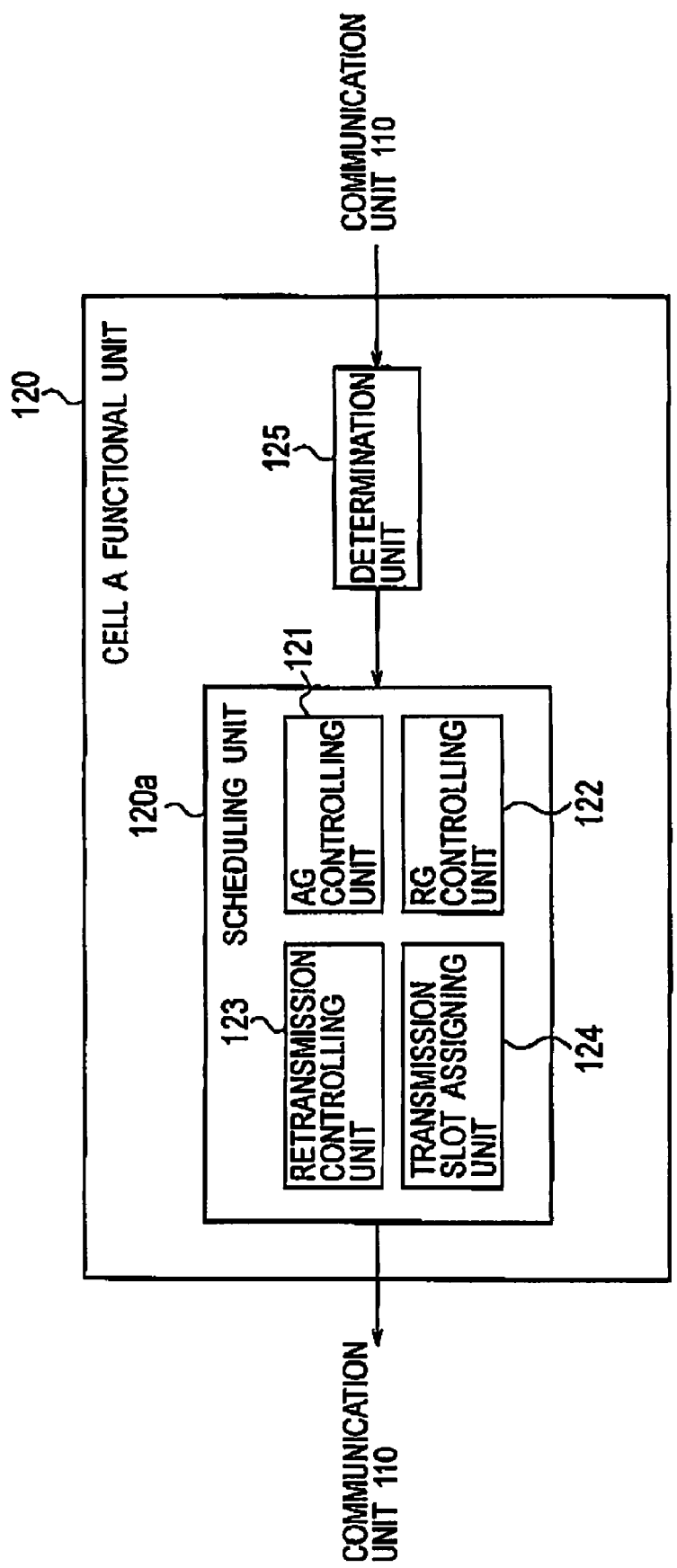
FIG. 5 is a block diagram showing a cell A functional unit 120 according to the first embodiment.

With reference to the accompanying drawings, description will be given of a configuration of the cell according to the first embodiment. FIG. 5 is a block diagram showing the cell (the cell A functional unit 120) according to the first embodiment. Here, description will be given for an example in which the cell A functional unit 120 functions as a serving cell.

As shown in FIG. 5, the cell A functional unit 120 includes: a scheduling unit 120*a* and a determination unit 125. The scheduling unit 120*a* is configured to perform the radio resource allocation for the radio terminal 10, and the like. Here, the radio terminal 10 uses the cell A as the serving cell;

The scheduling unit 120*a* includes: an AG controlling unit 121, an RG controlling unit 122, a retransmission controlling unit 123 and a transmission slot assigning unit 124. The scheduling unit 120*a* is operated in a MAC-e (Media Access Control Enhanced) layer.

The AG controlling unit 121 transmits an AG via the E-AGCH to the radio terminal 10. Note that the AG is a command for directly specifying a value of the transmission rate without relying on the current transmission rate.

The RG controlling unit 122 transmits an RG via the E-RGCH to the radio terminal 10 (serving radio terminal of the cell A). Note that the RG includes the increase command "Up" for instructing the increase of the current transmission rate, the retention command "Hold" for instructing the retention of the current transmission rate, and the decrease command "Down" for instructing the decrease of the current transmission rate. As described above, the increase command "Up" instructs the increase of the transmission rate by a predetermined amount and the decrease command "Down" instructs the decrease by a predetermined amount. The predetermined amount for the increase may be the same as or smaller than the predetermined amount for the decrease.

Note that the AG controlling unit 121 and the RG controlling unit 122 control the SG assigned to the radio terminal 10 by referring to the UL scheduling information received from the radio terminal 10, and the like.

The retransmission controlling unit 123 determines, for each block (for each process), whether or not an error is occurred in the uplink user data, Thereafter, the retransmission controlling unit 123 requests the radio terminal 10 to retransmit a block in which an error is occurred (hereinafter referred to as an error block). Here, a retransmission control technique is a HARQ (Hybrid Automatic Repeat Request) technique for combining a block firstly transmitted from the radio terminal 10 (hereinafter referred to as a transmission block) with a block retransmitted from the radio terminal 10 (hereinafter referred to as a retransmission block).

The transmission slot assigning unit 124 assigns, to the radio terminal 10, a transmission slot (that is, a process included in one TTI) to be used for transmitting the uplink user data (block) via the E-DPDCH. Note that the radio terminal 10 transmits the transmission block or the retransmission block to the base station 100 by using the process (active process) assigned by the transmission slot assigning unit 124.

The determination unit 125 determines whether or not a UPH included in the UL scheduling information received from the radio terminal 10 is below a first threshold. Here, when the UPH is high, the transmission power of the DPCCH is small and it can be considered that the radio terminal 10 is located in the vicinity of the base station 100. On the other hand, when the UPH is low, the transmission power of the DPCCH is large and it can be considered that the radio terminal 10 is located at the end of the cell. In other words, the determination unit 125 determines whether or not the radio terminal 10 is located at the end of the cell by comparing the UPH with the first threshold.

When the determination unit 125 determines that the UPH is below the first threshold, the scheduling unit 120*a* transmits, to the radio terminal 10, transmission rate control data (transmission rate decrease data) that instructs a decrease of the SG assigned to the radio terminal 10. In other words, the scheduling unit 120*a* transmits the transmission rate decrease data, to the radio terminal 10, when the determination unit 125 determines that the radio terminal 10 is located at the end of the cell.

For example, as the transmission rate decrease data, the AG controlling unit 121 transmits, to the radio terminal 10, an AG specifying an SG lower than the SG (current SG) assigned to the radio terminal 10. Here, the AG may be data specifying a specific value (SG) smaller than the current SG or may be data specifying a value (SG) smaller than the current SG by a predetermined value.

Note that, the AG controlling unit 121 may transmit, to the radio terminal 10, an AG ("Inactive") for limiting the use of active processes assigned to the radio terminal 10. As the transmission rate decrease data, the RG controlling unit 122 may transmit, to the radio terminal 10, an RG (decrease command "Down") that instructs a decrease of the SG.

(Operations of Base Station (Cell))

With reference to the accompanying drawings, description will be given below of operations of the base station (cell) according to the first embodiment FIG. 6 is a flowchart showing operations of the base station 100 (cell) according to the first embodiment.

As shown in FIG. 6, in Step 10, the base station 100 receives UL scheduling information from the radio terminal 10 using the cell controlled by the base station 100 as a serving cell.

In Step 20, the base station 100 determines whether or not a UPH (transmission power ratio) included in the UL scheduling information received in Step 10 is below the first threshold. When the UPH (transmission power ratio) is below the first threshold, the base station 100 moves to a processing of Step 30. On the other hand, when the UPH (transmission power ratio) is not below the first threshold, the base station 100 moves to a processing of Step 40.

In Step 30, the base station 100 controls the SG to be assigned to the radio terminal 10 in consideration of the UPH included in the UL scheduling information. Specifically, the base station 100 determines that the radio terminal 10 is located at the end of the cell, and transmits, to the radio terminal 10, the transmission rate decrease data (AG or RG) that instructs the decrease of the SG.

For example, the base station 100 transmits, to the radio terminal 10, an AG specifying a SG that can transmit one MAC-d PDU. Note that, the MAC-d PDU is a minimum data unit (Protocol Data Unit) operated in a MAC-d layer.

In Step 40, the base station 100 controls the SG to be assigned to the radio terminal 10 by referring to various information ("HLID", "TEBS" and "HLBS") included in the UL scheduling information. Specifically, the base station 100 controls the SG to be assigned to the radio terminal 10 by transmitting the AG or RG. Note that, in Step 40, the base station 100 controls the SG to be assigned to the radio terminal 10 without considering the UPH included in the UL scheduling information.

(Operations and Effects)

In the first embodiment, the scheduling unit 120*a* transmits, to the radio terminal 10, the transmission rate decrease data that instructs a decrease of the transmission rate, when the UPH included in the UL scheduling information is below the first threshold. Therefore, when the radio terminal 10 is located at the end of the cell (own cell) and transmits the uplink user data, the interference power caused in the different cell can be suppressed.

Second Embodiment

With reference to the accompanying drawings, a second embodiment will be described below. The following description is mainly given of differences between the first embodiment described above and the second embodiment.

Specifically, in the first embodiment described above, the base station 100 transmits the transmission rate decrease data to the radio terminal 10, when the UPH (transmission power ratio) included in the UL scheduling information received from the radio terminal 10 is below the first threshold.

Meanwhile, in the second embodiment, a base station 100 (a determination unit 125) determines whether or not a power ratio difference exceeds a second threshold. Here, the power ratio difference indicates a difference obtained by subtracting a new UPH (new transmission power ratio) from the old UPH (old transmission power ratio). Subsequently, the base station 100 (a scheduling unit 120*a*) transmits the transmission rate decrease data to a radio terminal 10, when the power ratio difference exceeds the second threshold.

Note that, the old UPH is the UPH included in the UL scheduling information referred to when controlling the SG currently assigned to the radio terminal 10. The new UPH (new transmission power ratio) indicates the UPH included in the UL scheduling information newly received from the radio terminal 10.

Here, when the power ratio difference is large, it can be considered that the new UPH is smaller than the old UPH. In other words, when the power ratio difference is large, it is considered that the transmission power of the DPCCH is increased and the radio terminal 10 is moving toward the end of the cell.

(Operations of Base Station (Cell))

With reference to the accompanying drawings, description will be given below of operations of the base station (cell) according to the second embodiment. FIG. 7 is a flowchart showing operations of the base station 100 (cell) according to the second embodiment. Note that, in FIG. 7, the same processings as those shown in FIG. 6 are denoted by the same step numbers.

As shown in FIG. 7, in Step 25, the base station 100 determines whether or not a power ratio difference exceeds a second threshold, the power ratio difference being a difference obtained by subtracting a new UPH (new transmission power ratio) from the old UPH (old transmission power ratio). When the power ratio difference exceeds the second threshold, the base station 100 moves to a processing of Step 50. On the other hand, when the power ratio difference does not exceed the second threshold, the base station 100 moves to a processing of Step 40.

In Step 50, the base station 100 controls a SG to be assigned to the radio terminal 10 in consideration of the UPH included in the UL scheduling information. Specifically, the base station 100 determines that the radio terminal 10 is located at the end of the cell and transmits, to the radio terminal 10, the transmission rate decrease data (AG or RG) that instructs the decrease of the SG.

For example, the base station 100 calculates a maximum transmission power allowed to the radio terminal 10, based on a reception power of the DPCCH and the new UPH. Subsequently, the base station 100 subtracts a predetermined margin from the maximum transmission power and further subtracts a transmission power used for a channel (DPDCH, DPCCH or the like) other than the E-DPDCH. Thereafter, the base station 100 transmits, to the radio terminal 10, an AG specifying a SG corresponding to the value thus obtained.

(Operations and Effects)

In the second embodiment, the base station 100 transmits, to the radio terminal 10, the transmission rate decrease data that instructs the decrease of the transmission rate, when the difference (power ratio difference) obtained by subtracting the new UPH from the old UPH exceeds the second threshold. Therefore, when the radio terminal 10 is moving toward the end of the own cell and transmit the uplink user data, and when the interference power is generated in the different cell, the interference power caused in the different cell can be suppressed.

Third Embodiment

With reference to the accompanying drawings, a third embodiment will be described below. The following description is mainly given of differences between the second embodiment described above and the third embodiment.

Specifically, in the second embodiment described above, the base station 100 transmits the transmission rate decrease data to the radio terminal 10, when the UPH (transmission power ratio) included in the UL scheduling information received from the radio terminal 10 is below the first threshold or when the power ratio difference exceeds the second threshold.

Meanwhile, in the third embodiment, a base station 100 (a determination unit 125) determines whether or not a reception quality value (for example, CQI; Channel Quality Indicator) received from a radio terminal 10 is below a third threshold. Subsequently, the base station 100 (a scheduling unit 120a) transmits the transmission rate decrease data to the radio terminal 10, when the UPH (transmission power ratio) is below the first threshold and the reception quality value (CQI) is below the third threshold. Alternatively, the base station 100 (the scheduling unit 120a) transmits the transmission rate decrease data to the radio terminal 10, when the power ratio difference exceeds the second threshold and the reception quality value (CQI) is below the third threshold.

Note that, the reception quality value is a value indicating reception quality of a downlink signal (for example, CPICH; Common Pilot Channel), which is transmitted from the base station 100 to the radio terminal 10. As the reception quality, a SIR (Signal to Interference Ratio), Ec/No or the like can be used.

Note that, the base station 100 may compare the third threshold with a true average value or a dB average value of the reception quality value received from the radio terminal 10 in a predetermined section. Moreover, the base station 100 may compare the third threshold with the latest reception quality value received from the radio terminal 10.

(Configuration of Radio Terminal)

Figure 8:
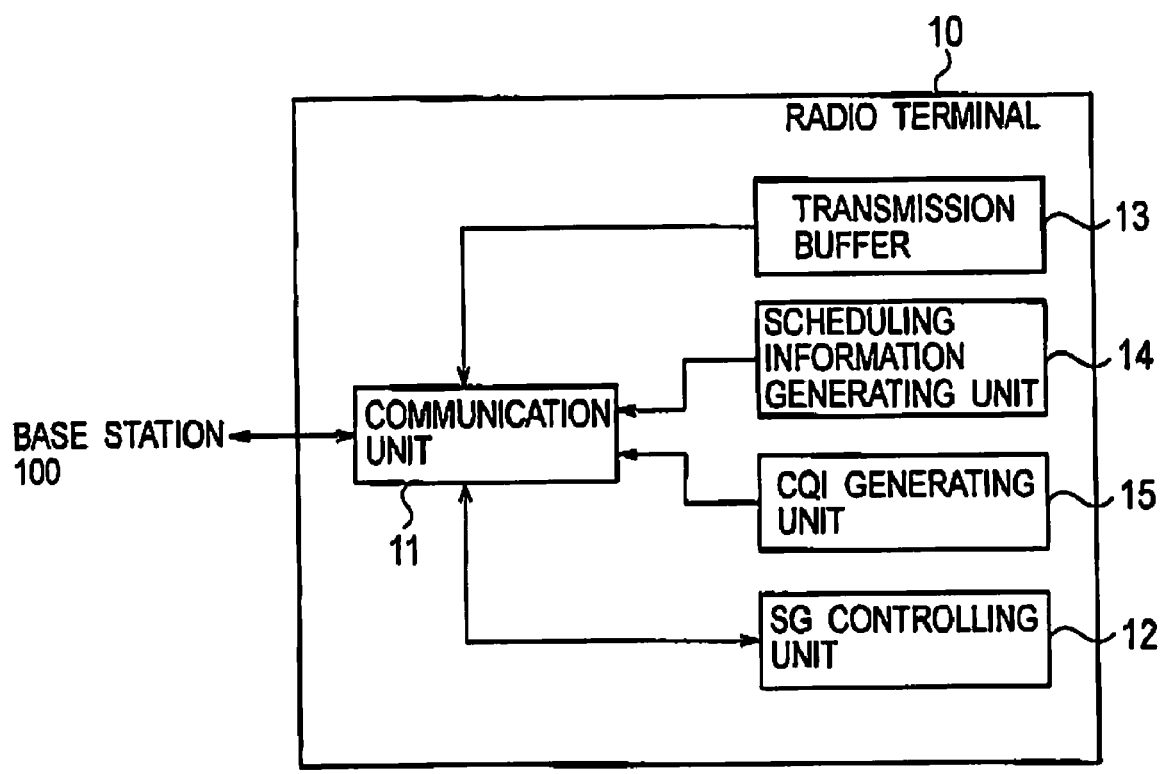
FIG. 8 is a block diagram showing a radio terminal 10 according to a third embodiment.

With reference to the accompanying drawings, description will be given below of a configuration of the radio terminal according to the third embodiment FIG. 8 is a block diagram showing the radio terminal 10 according to the third embodiment. Note that, in FIG. 8, the same constituent components as those shown in FIG. 3 are denoted by the same reference numerals.

As shown in FIG. 8, the radio terminal 10 includes a CQI generating unit 15 in addition to the configuration shown in FIG. 3. The CQI generating unit 15 measures a reception quality of a downlink signal (for example, CPICH; Common Pilot Channel) received from the base station 100. Moreover, the CQI generating unit 15 generates a reception quality value (CQI) indicating reception quality of the downlink signal. Note that, a communication unit 11 transmits the reception quality value (CQI) to the base station 100.

(Operations of Base Station (Cell))

Figure 9:
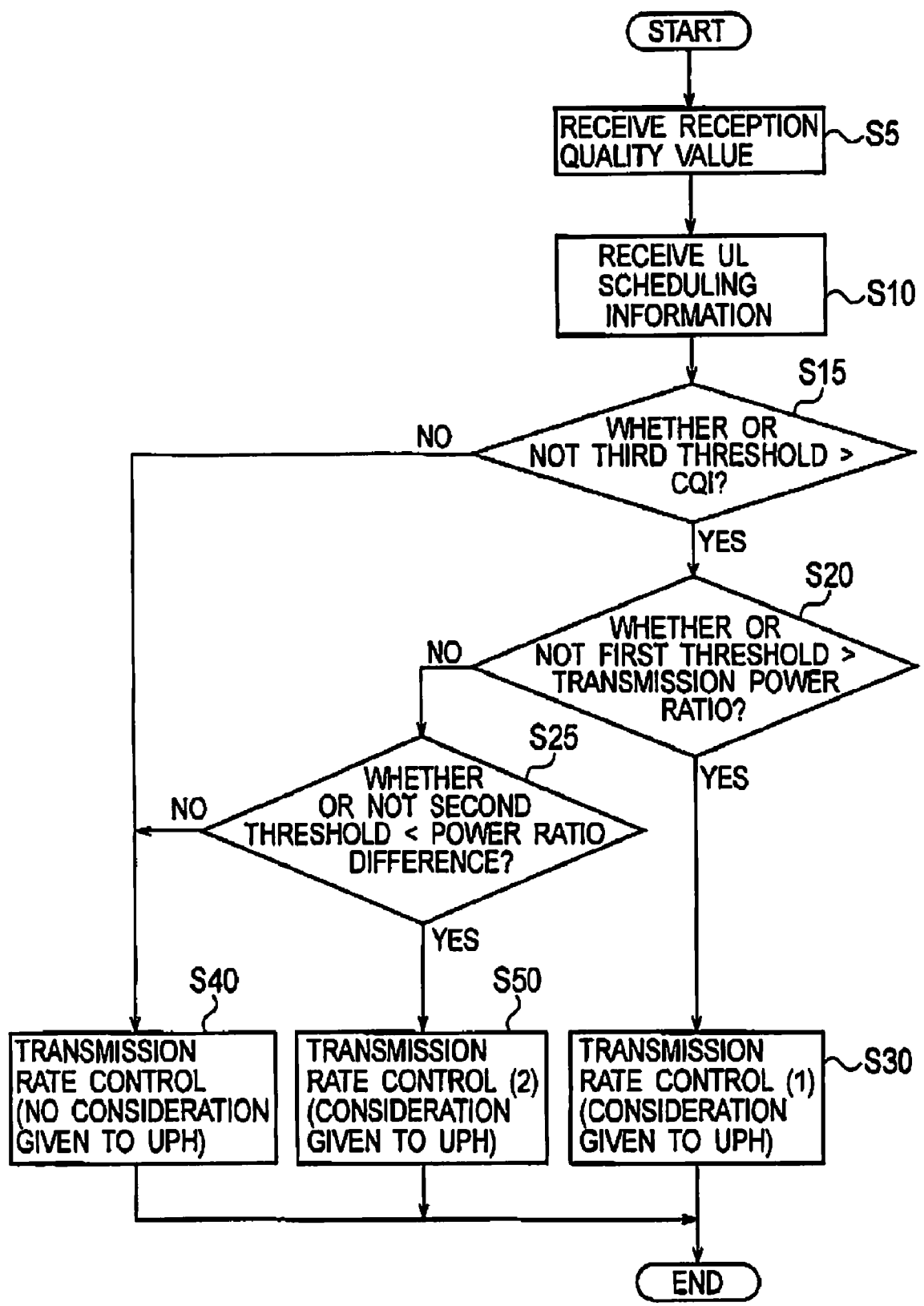
FIG. 9 is a flowchart showing operations of a base station 100 (cell) according to the third embodiment.

With reference to the accompanying drawings, description will be given below of operations of the base station (cell) according to the third embodiment. FIG. 9 is a flowchart showing operations of the base station 100 (cell) according to the third embodiment. Note that, in FIG. 9, the same processings as those shown in FIG. 7 are denoted by the same step numbers.

As shown in FIG. 9, in Step 5, the base station 100 receives, from the radio terminal 10, a reception quality value (CQI) indicating the reception quality of the downlink signal.

In Step 15, the base station 100 determines whether or not the reception quality value (CQI) is below a third threshold. When the reception quality value (CQI) is below the third threshold, the base station 100 moves to a processing of Step 20. On the other hand, when the reception quality value (CQI) is not below the third threshold, the base station 100 moves to a processing of Step 40.

(Operations and Effects)

In the third embodiment, when the reception quality value (CQI) is below the third threshold, the base station 100 performs a comparison processing (Step 20) of comparing the UPH with the first threshold or a comparison processing (Step 25) of comparing the power ratio difference with the second threshold. Therefore, accuracy of determination as to whether or not the radio terminal 10 is located at the end of the cell is improved. Thus, the interference power generated in the different cell can be more properly suppressed.

Other Embodiments

The present invention has been described by use of the embodiments described above. However, it should be understood that the present invention is not limited to the description and drawings which constitute a part of this disclosure. From this disclosure, various alternative embodiments, examples and operational technologies will become apparent to those skilled in the art For example, in the embodiments described above, the description was given for an example in which the base station 100 controls the SG assigned to the radio terminal 10. However, the present invention is not limited thereto. Specifically, the radio terminal 10 may control the SG assigned thereto by the radio terminal 10 itself. As such case, the following two cases are conceivable:

(1) when the transmission power ratio (UPH) is below the first threshold, the radio terminal 10 (the SG controlling unit 12) decreases the SG assigned thereto.

(2) when the power ratio difference (difference obtained by subtracting a new transmission power ratio (new UPH) from the old transmission power ratio (old UPH)) exceeds the second threshold, the radio terminal 10 (the SG controlling unit 12) decreases the SG assigned thereto. The old transmission power ratio is the transmission power ratio used when controlling the SG assigned to the radio terminal 10. The new transmission power ratio is the transmission power ratio newly acquired by the scheduling information generating unit 14.

What is claimed is:

1. A radio communication system, comprising:
a radio terminal configured to transmit uplink user data to a base station via an enhanced dedicated physical data channel and a transmission rate of the uplink user data is determined based on a channel power ratio indicating a ratio of a transmission power of the enhanced dedicated physical data channel to a transmission power of a dedicated physical control channel, wherein the radio terminal includes a terminal side transmitting unit configured to transmit, to the base station, uplink scheduling information, which includes at least a transmission power ratio indicating a ratio of a maximum transmission power allowed to the radio terminal to the transmission power of the dedicated physical control channel, and
the base station includes:
a controlling unit configured to control the transmission rate assigned to the radio terminal by referring to the uplink scheduling information;
a determination unit configured to determine whether or not a power ratio difference exceeds a second threshold, the power ratio difference being a difference obtained by subtracting a new transmission power ratio from an old transmission power ratio and the second threshold being a threshold to be compared with the power ratio difference; and
a base station side transmitting unit configured to transmit, to the radio terminal, transmission rate decrease data that instructs a decrease of the transmission rate assigned to the radio terminal, when the power ratio difference exceeds the second threshold,
the old transmission power ratio indicates the transmission power ratio included in the uplink scheduling information referred to when the base station controls the transmission rate assigned to the radio terminal, and
the new transmission power ratio indicates the transmission power ratio included in the uplink scheduling information newly received from the radio terminal.

2. The radio communication system according to claim 1, wherein
the terminal side transmitting unit transmits, to the base station, a reception quality value indicating a reception quality of a downlink signal received from the base station,
the determination unit determines whether or not the reception quality value is below a third threshold, the third threshold being a threshold to be compared with the reception quality value, and
the base station side transmitting unit transmits, to the radio terminal, the transmission rate decrease data, when the power ratio difference exceeds the second threshold and the reception quality value is below the third threshold.

3. A radio communication system, comprising:
a radio terminal configured to transmit uplink user data to a base station via an enhanced dedicated physical data channel and a transmission rate of the uplink user data is determined based on a channel power ratio indicating a ratio of a transmission power of the enhanced dedicated physical data channel to a transmission power of a dedicated physical control channel, wherein the radio terminal includes:
a terminal side transmitting unit configured to transmit, to the base station, uplink scheduling information, which includes at least a transmission power ratio indicating a ratio of a maximum transmission power allowed to the radio terminal to the transmission power of the dedicated physical control channel, and
the base station includes:
a determination unit configured to determine whether or not the transmission power ratio is below a first threshold, the first threshold being a threshold to be compared with the transmission power ratio,
a base station side transmitting unit configured to transmit, to the radio terminal, transmission rate decrease data that instructs a decrease of the transmission rate assigned to the radio terminal, when the transmission power ratio is below the first threshold, and
a controlling unit configured to control the transmission rate assigned to the radio terminal by referring to the uplink scheduling information, wherein the determination unit determines whether or not a power ratio difference exceeds a second threshold, the power ratio difference being a difference obtained by subtracting a new transmission power ratio from an old transmission power ratio and the second threshold being a threshold to be compared with the power ratio difference,
the old transmission power ratio indicates the transmission power ratio included in the uplink scheduling information referred to when the base station controls the transmission rate assigned to the radio terminal,
the new transmission power ratio indicates the transmission power ratio included in the uplink scheduling information newly received from the radio terminal, and
the base station side transmitting unit transmits, to the radio terminal, transmission rate decrease data, when the power ratio difference exceeds the second threshold.

4. A radio communication system, comprising:
a radio terminal configured to transmit uplink user data to a base station via an enhanced dedicated physical data channel and a transmission rate of the uplink user data is determined based on a channel power ratio indicating a ratio of a transmission power of the enhanced dedicated physical data channel to a transmission power of a dedicated physical control channel, wherein the radio terminal includes:
a terminal side transmitting unit configured to transmit, to the base station, uplink scheduling information, which includes at least a transmission power ratio indicating a ratio of a maximum transmission power allowed to the radio terminal to the transmission power of the dedicated physical control channel and, a reception quality value indicating a reception quality of a downlink signal received from the base station, and
the base station includes:
a determination unit configured to:
determine whether or not the transmission power ratio is below a first threshold, the first threshold being a threshold to be compared with the transmission power ratio;
determine whether or not a power ratio difference exceeds a second threshold, the power ratio difference being a difference obtained by subtracting a new transmission power ratio from an old transmission power ratio and the second threshold being a threshold to be compared with the power ratio difference, wherein the old transmission power ratio indicates the transmission power ratio used for controlling the transmission rate assigned to the radio terminal, and the new transmission power ratio indicates the transmission power ratio newly obtained by the obtaining unit; and
determine whether or not the reception quality value is below a third threshold, the third threshold being a threshold to be compared with the reception quality value; and
a base station side transmitting unit configured to transmit, to the radio terminal, transmission rate decrease data that instructs a decrease of the transmission rate assigned to the radio terminal, when the transmission power ratio is below the first threshold, and when the transmission power ratio is below the first threshold and the reception quality value is below the third threshold.

5. A radio communication method in which a radio terminal transmits uplink user data to a base station via an enhanced dedicated physical data channel, the method comprising:
determining a transmission rate of the uplink user data based on a channel power ratio indicating a ratio of a transmission power of the enhanced dedicated physical data channel to a transmission power of a dedicated physical control channel;
transmitting, from the radio terminal to the base station, uplink scheduling information, which includes at least a transmission power ratio indicating a ratio of a maximum transmission power allowed to the radio terminal to the transmission power of the dedicated physical control channel;
determining, at the base station, whether or not the transmission power ratio is below a first threshold, the first threshold being a threshold to be compared with the transmission power ratio;
transmitting, from the base station to the radio terminal, transmission rate decrease data that instructs a decrease of the transmission rate assigned to the radio terminal, when the transmission power ratio is below the first threshold;

controlling unit the transmission rate assigned to the radio terminal by referring to the uplink scheduling information;
determining whether or not a power ratio difference exceeds a second threshold, the power ratio difference being a difference obtained by subtracting a new transmission power ratio from an old transmission power ratio and the second threshold being a threshold to be compared with the power ratio difference, wherein the old transmission power ratio indicates the transmission power ratio included in the uplink scheduling information referred to when the base station controls the transmission rate assigned to the radio terminal, and the new transmission power ratio indicates the transmission power ratio included in the uplink scheduling information newly received from the radio terminal, and
transmitting, to the radio terminal, transmission rate decrease data, when the power ratio difference exceeds the second threshold.

6. A radio communication method in which a radio terminal transmits uplink user data to a base station via an enhanced dedicated physical data channel, the method comprising:
determining a transmission rate of the uplink user data based on a channel power ratio indicating a ratio of a transmission power of the enhanced dedicated physical data channel to a transmission power of a dedicated physical control channel;
transmitting, from the radio terminal to the base station, uplink scheduling information, which includes at least a transmission power ratio indicating a ratio of a maximum transmission power allowed to the radio terminal to the transmission power of the dedicated physical control channel;
controlling, at the base station, the transmission rate assigned to the radio terminal by referring to the uplink scheduling information;
determining, at the base station, whether or not a power ratio difference exceeds a second threshold, the power ratio difference being a difference obtained by subtracting a new transmission power ratio from an old transmission power ratio and the second threshold being a threshold to be compared with the power ratio difference; and
transmitting, from the base station to the radio terminal, transmission rate decrease data that instructs a decrease of the transmission rate assigned to the radio terminal, when the power ratio difference exceeds the second threshold; wherein
the old transmission power ratio indicates the transmission power ratio included in the uplink scheduling information referred to when the base station controls the transmission rate assigned to the radio terminal, and
the new transmission power ratio indicates the transmission power ratio included in the uplink scheduling information newly received from the radio terminal.

7. A base station, comprising:
a receiving unit configured to receive, from a radio terminal, uplink user data via an enhanced dedicated physical data channel and to determine a transmission rate of the uplink user data based on a channel power ratio indicating a ratio of a transmission power of the enhanced dedicated physical data channel to a transmission power of a dedicated physical control channel,
the receiving unit configured to receive uplink scheduling information, which includes at least a transmission power ratio indicating a ratio of a maximum transmission power allowed to the radio terminal to the transmission power of the dedicated physical control channel;

a determination unit configured to determine whether or not the transmission power ratio is below a first threshold, the first threshold being a threshold to be compared with the transmission power ratio; and a base station side transmitting unit configured to transmit, to the radio terminal, transmission rate decrease data that instructs a decrease of the transmission rate assigned to the radio terminal, when the transmission power ratio is below the first threshold, wherein the base station is further configured;

a controlling unit configured to control the transmission rate assigned to the radio terminal by referring to the uplink scheduling information, wherein the determination unit determines whether or not a power ratio difference exceeds a second threshold, the power ratio difference being a difference obtained by subtracting a new transmission power ratio from an old transmission power ratio and the second threshold being a threshold to be compared with the power ratio difference, the old transmission power ratio indicates the transmission power ratio included in the uplink scheduling information referred to when the base station controls the transmission rate assigned to the radio terminal, the new transmission power ratio indicates the transmission power ratio included in the uplink scheduling information newly received from the radio terminal, and the base station side transmitting unit transmits, to the radio terminal, transmission rate decrease data, when the power ratio difference exceeds the second threshold.

8. A base station, comprising:

a receiving unit configured to receive, from a radio terminal, uplink user data via an enhanced dedicated physical data channel and to determine a transmission rate of the uplink user data based on a channel power ratio indicating a ratio of a transmission power of the enhanced dedicated physical data channel to a transmission power of a dedicated physical control channel, the receiving unit configured to receive uplink scheduling information, which includes at least a transmission power ratio indicating a ratio of a maximum transmission power allowed to the radio terminal to the transmission power of the dedicated physical control channel;

a controlling unit configured to control the transmission rate assigned to the radio terminal by referring to the uplink scheduling information;

a determination unit configured to determine whether or not a power ratio difference exceeds a second threshold, the power ratio difference being a difference obtained by subtracting a new transmission power ratio from an old transmission power ratio and the second threshold being a threshold to be compared with the power ratio difference; and a base station side transmitting unit configured to transmit, to the radio terminal, transmission rate decrease data that instructs a decrease of the transmission rate assigned to the radio terminal, when the power ratio difference exceeds the second threshold; wherein the old transmission power ratio indicates the transmission power ratio included in the uplink scheduling information referred to when the base station controls the transmission rate assigned to the radio terminal, and the new transmission power ratio indicates the transmission power ratio included in the uplink scheduling information newly received from the radio terminal.

9. A radio terminal which transmits uplink user data to a base station via an enhanced dedicated physical data channel, comprising:

an obtaining unit configured to obtain a transmission power ratio indicating a ratio of a maximum transmission power allowed to the radio terminal to the transmission power of the dedicated physical control channel; and a transmission rate controlling unit configured to transmit uplink user data based on a channel power ratio indicating a ratio of a transmission power of the enhanced dedicated physical data channel to a transmission power of a dedicated physical control channel;

to decrease a transmission rate assigned to the radio terminal, when the transmission power ratio is below a first threshold, the first threshold being a threshold to be compared with the transmission power ratio; and to decrease a transmission rate assigned to the radio terminal based upon a power ratio difference exceeding a second threshold, the power ratio difference being a difference obtained by subtracting a new transmission power ratio from an old transmission power ratio and the second threshold being a threshold to be compared with the power ratio difference, wherein the old transmission power ratio indicates the transmission power ratio included in the uplink scheduling information referred to when the base station controls the transmission rate assigned to the radio terminal, and the new transmission power ratio indicates the transmission power ratio included in the uplink scheduling information newly received from the radio terminal.

10. A radio terminal which transmits uplink user data to a base station via an enhanced dedicated physical data channel, comprising:

an obtaining unit configured to obtain a transmission power ratio indicating a ratio of a maximum transmission power allowed to the radio terminal to the transmission power of the dedicated physical control channel; and a transmission rate controlling unit configured to transmit uplink user data based on a channel power ratio indicating a ratio of a transmission power of the enhanced dedicated physical data channel to a transmission power of a dedicated physical control channel; and to decrease a transmission rate assigned to the radio terminal, when a power ratio difference exceeds a second threshold, the power ratio difference being a difference obtained by subtracting a new transmission power ratio from an old transmission power ratio and the second threshold being a threshold to be compared with the power ratio difference, wherein the old transmission power ratio indicates the transmission power ratio used for controlling the transmission rate assigned to the radio terminal, and the new transmission power ratio indicates the transmission power ratio newly obtained by the obtaining unit.

* * * * *